United States Patent
Eckert et al.

(10) Patent No.: US 9,988,559 B2
(45) Date of Patent: *Jun. 5, 2018

(54) QUANTUM DOT ARTICLE WITH IMPROVED EDGE INGRESS

(71) Applicant: 3M INNOVATIVE PROPERTIES COMPANY, St. Paul, MN (US)

(72) Inventors: Karissa L. Eckert, Blaine, MN (US); Eric W. Nelson, Stillwater, MN (US); Wayne S. Mahoney, St. Paul, MN (US); Mary M. Caruso Dailey, Maplewood, MN (US); Sonja S. Mackey, St. Paul, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/106,372

(22) PCT Filed: Dec. 17, 2014

(86) PCT No.: PCT/US2014/070793
§ 371 (c)(1),
(2) Date: Jun. 20, 2016

(87) PCT Pub. No.: WO2015/095296
PCT Pub. Date: Jun. 25, 2015

(65) Prior Publication Data
US 2016/0340553 A1    Nov. 24, 2016

Related U.S. Application Data

(60) Provisional application No. 61/919,219, filed on Dec. 20, 2013.

(51) Int. Cl.
*C09J 4/06* (2006.01)
*B32B 27/08* (2006.01)
(Continued)

(52) U.S. Cl.
CPC ............... *C09J 4/06* (2013.01); *B32B 7/12* (2013.01); *B32B 27/08* (2013.01); *B32B 27/18* (2013.01);
(Continued)

(58) Field of Classification Search
CPC .......... B32B 27/08; B32B 7/12; B32B 27/20; B32B 27/308; B32B 27/18;
(Continued)

(56) References Cited

U.S. PATENT DOCUMENTS

| 3,317,469 A | 5/1967 | Feichtinger |
| 5,631,332 A | 5/1997 | Karasawa |

(Continued)

FOREIGN PATENT DOCUMENTS

| CN | 101942073 | 1/2011 |
| JP | S54-004992 | 1/1979 |

(Continued)

OTHER PUBLICATIONS

STIC Search Report dated Jul. 7, 2017.*
(Continued)

*Primary Examiner* — Eisa B Elhilo
(74) *Attorney, Agent, or Firm* — Lisa P. Fulton

(57) ABSTRACT

A quantum dot film article includes a first barrier layer; a second barrier layer; and a quantum dot layer between the first barrier layer and the second barrier layer. The quantum dot layer has quantum dots dispersed in a matrix including a cured adhesive composition, wherein the adhesive composition includes: an epoxide; an amino-functional compound of Formula I: wherein A is a monocyclic or a polycyclic alkylene group, or a monocyclic or a polycyclic heteroalkylene group, and m and n are integers each independently selected from 0 to 5; and a radiation curable methacrylate compound.

22 Claims, 2 Drawing Sheets

(51) Int. Cl.
| | |
|---|---|
| *B32B 27/18* | (2006.01) |
| *B32B 7/12* | (2006.01) |
| *B32B 27/20* | (2006.01) |
| *B32B 27/30* | (2006.01) |
| *C09J 9/00* | (2006.01) |
| *C09J 11/04* | (2006.01) |
| *C09K 11/02* | (2006.01) |
| *F21V 8/00* | (2006.01) |
| *G02F 1/1335* | (2006.01) |

(52) U.S. Cl.
CPC ............ *B32B 27/20* (2013.01); *B32B 27/308* (2013.01); *C09J 9/00* (2013.01); *C09J 11/04* (2013.01); *C09K 11/02* (2013.01); *B32B 2255/10* (2013.01); *B32B 2255/26* (2013.01); *B32B 2307/7242* (2013.01); *B32B 2457/20* (2013.01); *B32B 2457/202* (2013.01); *G02B 6/005* (2013.01); *G02B 6/0055* (2013.01); *G02F 1/133504* (2013.01); *G02F 1/133528* (2013.01); *G02F 1/133553* (2013.01); *G02F 2001/133507* (2013.01)

(58) Field of Classification Search
CPC ............ B32B 2457/02; B32B 2255/10; B32B 2307/7242; B32B 2457/20; B32B 6/005; C09K 11/02; C09J 11/04; C09J 9/00; G02F 2001/133507; G02F 1/133553
See application file for complete search history.

(56) References Cited

U.S. PATENT DOCUMENTS

| | | |
|---|---|---|
| 5,876,210 A | 3/1999 | Klee |
| 6,369,164 B1 | 4/2002 | Klee |
| 2003/0127659 A1 | 7/2003 | Bawendi |
| 2011/0051047 A1 | 3/2011 | O'Neill |
| 2011/0140084 A1 | 6/2011 | Hatori |
| 2011/0284824 A1 | 11/2011 | Liu |
| 2012/0113671 A1* | 5/2012 | Sadasivan ............ C09D 11/101 362/602 |
| 2012/0113672 A1 | 5/2012 | Dubrow |

FOREIGN PATENT DOCUMENTS

| | | |
|---|---|---|
| KR | 10-2012-0095486 | 8/2012 |
| KR | 10-2013-0053811 | 5/2013 |
| WO | 2014-113562 | 7/2014 |
| WO | 2014-123724 | 8/2014 |

OTHER PUBLICATIONS

STIC Search Report dated Jul. 10, 2017.*
International Search Report for PCT International Application No. PCT/US2014/070793, dated Mar. 31, 2015, 5pgs.
Materials Science and Engineering Handbook, Chapter 8: Polymeric Materials, p. 116, Chemical Industry Press of China, Dec. 2003.

* cited by examiner

QUANTUM DOT ARTICLE WITH IMPROVED EDGE INGRESS

BACKGROUND

Quantum dot film articles include quantum dots dispersed in a matrix that is laminated between two barrier layers. The quantum dot articles, which include combinations of green and red quantum dots as fluorescing elements, can enhance color gamut performance when used in display devices such as, for example, liquid crystal displays (LCDs).

Quantum dots are highly sensitive to degradation, so the quantum dot article should have excellent barrier properties to prevent ingress of, for example, water and oxygen. The barrier layers protect the quantum dots in the interior regions of the laminate construction from damage caused by oxygen or water exposure, but the cut edges of the article expose the matrix materials to the atmosphere. In these edge regions the protection of the quantum dots dispersed in the matrix is primarily dependent on the barrier properties of the matrix itself.

SUMMARY

Some currently available matrix materials provide only minimal barrier properties, which can lead to a phenomenon called edge ingress. If water and/or oxygen enter the edge regions of the quantum dot article, the quantum dots on or adjacent to the exposed edge of the laminate construction can degrade and ultimately fail to emit light when excited by ultraviolet or blue light irradiation. This quantum dot degradation can cause a dark line around a cut edge of the film article, which can be detrimental to performance of a display in which the quantum dot article forms a part. Slowing or eliminating quantum dot degradation along the laminate edges is particularly important to extend the service life of the displays in smaller electronic devices such as those utilized in, for example, handheld devices and tablets.

In general, the present disclosure is directed to matrix formulations for use in quantum dot articles. The matrix formulations resist ingress from water and/or oxygen. These improved barrier properties can slow the degradation of the quantum dots on or adjacent to the edges of the quantum dot articles, which can extend the useful life of the articles in display applications.

In one embodiment, the present disclosure is directed to a quantum dot film article including:
a first barrier layer;
a second barrier layer; and
a quantum dot layer between the first barrier layer and the second barrier layer, the quantum dot layer including quantum dots dispersed in a matrix comprising a cured adhesive composition, wherein the adhesive composition includes:
an epoxide;
an amino-functional compound of Formula I:

   Formula 1 wherein A is a monocyclic or a polycyclic alkylene group, or a monocyclic or a polycyclic heteroalkylene group, and m and n are integers each independently selected from 0 to 5; and
a radiation curable methacrylate compound.

In another embodiment, the present disclosure is directed to a method of forming a film article, including coating a quantum dot material on a first polymeric film, the quantum dot material including quantum dots in an adhesive composition including:
an epoxide;
an amino-functional compound of Formula I:

   Formula I wherein A is a monocyclic or a polycyclic alkylene group, or a monocyclic or a polycyclic heteroalkylene group, and m and n are integers each independently selected from 0 to 5;
a radiation curable methacrylate compound; and
a photoinitiator.

In yet another embodiment, the present disclosure is directed to an adhesive composition, including:
an epoxide;
an amino-functional compound of Formula I:

   Formula I wherein A is a monocyclic or a polycyclic alkylene group, or a monocyclic or a polycyclic heteroalkylene group, and m and n are integers each independently selected from 0 to 5;
a radiation curable methacrylate compound;
a photoinitiator; and
quantum dots.

In yet another embodiment, the present disclosure is directed to an adhesive composition, including:
an epoxide;
an amino-functional compound of Formula I:

   Formula I wherein A is a monocyclic or a polycyclic alkylene group, or a monocyclic or a polycyclic heteroalkylene group, and m and n are integers each independently selected from 0 to 5; and
quantum dots.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
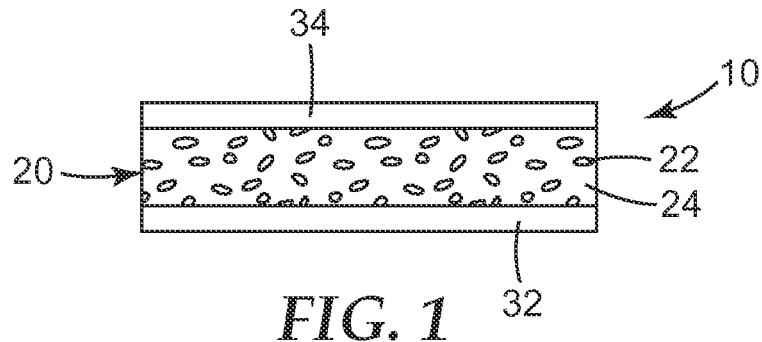
FIG. 1 is a schematic side elevation view of an edge region of an illustrative film article including quantum dots.

Referring to FIG. 1, an edge region of a quantum dot article 10 includes a first barrier layer 32, a second barrier layer 34, and a quantum dot layer 20 between the first barrier layer 32 and the second barrier layer 34. The quantum dot layer 20 includes a plurality of quantum dots 22 dispersed in a matrix 24.

The barrier layers 32, 34 can be formed of any useful material that can protect the quantum dots 22 from exposure to environmental contaminates such as, for example, oxygen, water, and water vapor. Suitable barrier layers 32, 34 include, but are not limited to, films of polymers, glass and dielectric materials. In some embodiments, suitable materials for the barrier layers 32, 34 include, for example, polymers such as polyethylene terephthalate (PET); oxides such as silicon oxide, titanium oxide, or aluminum oxide (e.g., $SiO_2$, $Si_2O_3$, $TiO_2$, or $Al_2O_3$); and suitable combinations thereof.

In some embodiments, each barrier layer 32, 34 of the quantum dot article 10 includes at least two sub-layers of different materials or compositions. In some embodiments, such a multi-layered barrier construction can more effectively reduce or eliminate pinhole defect alignment in the barrier layers 32, 34, providing a more effective shield against oxygen and moisture penetration into the matrix 24. The quantum dot article 10 can include any suitable material or combination of barrier materials and any suitable number of barrier layers or sub-layers on either or both sides of the quantum dot layer 20. The materials, thickness, and number of barrier layers and sub-layers will depend on the particular application, and will suitably be chosen to maximize barrier protection and brightness of the quantum dots 22 while minimizing the thickness of the quantum dot article 10. In some embodiments each barrier layer 32, 34 is itself a laminate film, such as a dual laminate film, where each barrier film layer is sufficiently thick to eliminate wrinkling in roll-to-roll or laminate manufacturing processes. In one illustrative embodiment, the barrier layers 32, 34 are polyester films (e.g., PET) having an oxide layer on an exposed surface thereof.

The quantum dot layer 20 can include one or more populations of quantum dots or quantum dot materials 22. Exemplary quantum dots or quantum dot materials 22 emit green light and red light upon down-conversion of blue primary light from a blue LED to secondary light emitted by the quantum dots. The respective portions of red, green, and blue light can be controlled to achieve a desired white point for the white light emitted by a display device incorporating the quantum dot article 10. Exemplary quantum dots 22 for use in the quantum dot articles 10 include, but are not limited to, CdSe with ZnS shells. Suitable quantum dots for use in quantum dot articles described herein include, but are not limited to, core/shell luminescent nanocrystals including CdSe/ZnS, InP/ZnS, PbSe/PbS, CdSe/CdS, CdTe/CdS or CdTe/ZnS. In exemplary embodiments, the luminescent nanocrystals include an outer ligand coating and are dispersed in a polymeric matrix. Quantum dot and quantum dot materials 22 are commercially available from, for example, Nanosys Inc., Milpitas, Calif. The quantum dot layer 20 can have any useful amount of quantum dots 22, and in some embodiments the quantum dot layer 20 can include from 0.1 wt % to 1 wt % quantum dots, based on the total weight of the quantum dot layer 20.

In some embodiments, the quantum dot materials can include quantum dots dispersed in a liquid carrier. For example, the liquid carrier can include an oil such as an amino-silicone oil.

In one or more embodiments the quantum dot layer 20 can optionally include scattering beads or particles. These scattering beads or particles have a refractive index that differs from the refractive index of the matrix material 24 by at least 0.05, or by at least 0.1. These scattering beads or particles can include, for example, polymers such as silicone, acrylic, nylon, and the like, or inorganic materials such as $TiO_2$, $SiO_x$, $AlO_x$, and the like, and combinations thereof. In some embodiments, including scattering particles in the quantum dot layer 20 can increase the optical path length through the quantum dot layer 20 and improve quantum dot absorption and efficiency. In many embodiments, the scattering beads or particles have an average particle size from 1 to 10 micrometers, or from 2 to 6 micrometers. In some embodiments, the quantum dot material 20 can optionally include fillers such fumed silica.

The matrix 24 of the quantum dot layer 20 can be formed from an adhesive that effectively adheres to the materials forming the barrier layers 32, 34 to form a laminate construction, and also forms a protective matrix for the quantum dots 22. In one embodiment, the matrix 24 is formed by curing or hardening an adhesive composition including an epoxy amine polymer and an optional radiation-curable methacrylate compound.

The epoxy amine polymer is a reaction product of an epoxide and an amino-functional curing agent, and adheres to a wide variety of barrier materials 32, 34. Suitable epoxides include epoxy resins with a bisphenol A backbone or a bisphenol F backbone, and in some embodiments the epoxides are multifunctional. Suitable examples of epoxides for using in the adhesive composition include, but are not limited to, diepoxides available from Momentive Specialty Chemicals, Columbus, Ohio, under the trade designations EPON 824 (bisphenol A backbone) and EPON 862 (bisphenol F backbone). Some epoxides with a bisphenol F backbone have been found to have superior barrier properties compared to epoxides with a bisphenol A backbone. While not wishing to be bound by any theory, presently available evidence indicates that the bisphenol F backbone is more compact and includes fewer substituents than the bisphenol A backbone, which can allow the bisphenol F epoxides to pack more closely together when forming a component of the matrix material 24, which can in some cases slow the ingress of water and oxygen.

The amino-functional curing agents include amino-functional compounds with a non-aromatic, cyclic aliphatic backbone, particularly those containing at least two amino groups connected to a cycloaliphatic ring or ring-system. In some embodiments, the amino-functional curing agent is represented by Formula I:

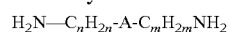  Formula I $H_2N-C_nH_{2n}-A-C_mH_{2m}NH_2$ wherein A is either a monocyclic or polycyclic alkylene group, or a monocyclic or polycyclic heteroalkylene group, and m and n are integers. In Formula I, m and n are each independently selected in the range from 0 to 5, or 1 to 5. The term alkylene group as used herein refers to a bivalent radical formed by removing a hydrogen atom from each of two different carbon atoms on a monocyclic or a polycyclic alkyl compound. The mono- or polycyclic alkyl can include a single ring, two rings, three rings, or multiple rings.

In various non-limiting embodiments, the monocyclic or polycyclic alkylene A groups can have up to 20 carbon atoms, up to 16 carbon atoms, up to 14 carbon atoms, up to 12 carbon atoms, up to 10 carbon atoms, or up to 7 carbon atoms. In various non-limiting embodiments, the monocyclic or polycyclic heteroalkylene A groups have up to 20 carbon atoms and up to 4 heteroatoms, up to 16 carbon atoms and up to 4 heteroatoms, up to 12 carbon atoms and up to 3 heteroatoms, or up to 10 carbon atoms and up to 3 heteroatoms. The heteroatoms are selected from oxygen, sulfur, nitrogen, or a combination thereof.

Non-limiting examples of A groups in Formula I are polycyclic alkylene groups having one or more bicyclo (2.2.1) heptane rings such as those described in Japanese Patent Application Kokai Publication S54004992. Groups of this type are represented by the following Formulas II and III:

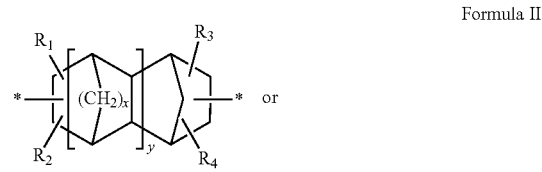

Formula II

-continued

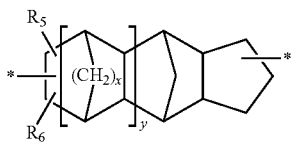

Formula III wherein $R_1$, $R_2$, $R_3$, $R_4$, $R_5$ and $R_6$ each represent either a hydrogen or a methyl group; and x and y each represent either 0 or 1. The asterisks (*) in Formulas II and III represent the positions where the polycyclic alkylene group A attaches to the amino or alkylamino groups in Formula I.

Specific examples of amino-functional curing agents including the groups represented by the general Formulas II and III are, 3(or 4), 8(or 9)-diaminomethyltricyclo(5,2,1, $0^{2.6}$) decane,

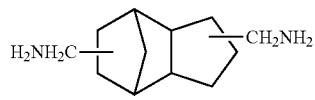

4,9(or 10)-diaminomethyltetracyclo(6,2,1,$1^{3.6}$,$0^{2.7}$) dodecane,

and 2,5(or 6)-diaminomethyl bicyclo(2,2,1)heptane.

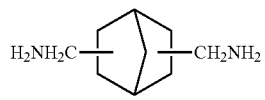

Diaminomethyl tricyclodecane is an example of a curing or hardening agent especially well suited for use in the adhesive composition. Other compounds suitable as curing or hardening agents include isophorone diamine (IPDA), 1,3-cyclohexanebis(methylamine), 1,4-bis(3-aminopropyl) piperazine. A suitable compound is available from Oxea Corp., Dallas, Tex., under the trade designation TCD-diamine, particularly octahydro-4,7-methano-1H-indenedimethylamine (which is also referred to as 3(or 4), 8(or 9)-diaminomethyltricyclo(5,2,1,$0^{2.6}$) decane). Again, while not wishing to be bound by any theory, presently available evidence indicates that the compact nature of the cyclic backbone can create more compact structures that pack closely together when forming the matrix material 24, which can in some cases slow ingress of water and oxygen.

The epoxy amine polymer is formed by thermal polymerization of one or a combination of the amine-functional curing or hardening agents described above, and one or a combination of the epoxide materials described above. In some embodiments, the epoxy to amine ratio in this reaction ranges stoichiometrically from about 0.6 to about 1.4, or from about 0.8 to about 1.2. In some embodiments, the refractive index of the epoxy amine polymer is in about 1.48 to about 1.60, or from about 1.50 to about 1.57. In some embodiments, the higher refractive index can improve scattering when low refractive index particles or emulsions are used, which can result in a longer optical path length and improved quantum dot efficiency. Conjugation in high refractive index materials also decreases the water vapor and oxygen transport rates within the matrix 24.

In various embodiments, the epoxy amine polymer forms about 70 wt % to about 100 wt %, or about 70 wt % to about 90 wt %, or about 75 wt % to about 85 wt %, of the adhesive composition, based on the total weight of the adhesive composition.

Due to the fast Michael addition of acrylates, in some embodiments methacrylates are used in the adhesive composition to preserve the working time of the epoxy amine polymer system in the adhesive composition. In some embodiments, the radiation curable methacrylate compound can increase the viscosity of the adhesive composition and can reduce defects that would otherwise be created during the thermal acceleration of the epoxy amine Useful radiation curable methacrylate compounds have barrier properties to prevent the ingress of water and/or oxygen. In some embodiments, methacrylate compounds with a glass transition temperature ($T_g$) of greater than about 100° C. and substituents capable of forming high crosslink densities can provide a matrix with improved gas and water vapor barrier properties. In some embodiments, the radiation curable methacrylate compound is multifunctional, and suitable examples include, but are not limited to, those available under the trade designations SR 348 (ethoxylated (2) bisphenol A dimethacrylate), SR540 (ethoxylated (4) bisphenol A dimethacrylate), and SR239 (1,6-hexane diol dimethacrylate) from Sartomer USA, LLC, Exton, Pa.

The methacrylate compound forms about 0 wt % to about 25 wt %, or about 5 wt % to about 25 wt % or about 10 wt % to about 20 wt %, of the adhesive composition. In some embodiments, if the methacrylate polymer forms less than 5 wt % of the adhesive composition, the methacrylate compound does not adequately increase the viscosity of the adhesive composition to provide the adhesive composition with a sufficient working time.

In some embodiments, the adhesive composition optionally includes about 0.1 wt % to about 10 wt % of a photoinitiator, based on the total weight of the adhesive composition. A wide variety of photoinitiators may be used, and suitable examples include, but are not limited to, those available from BASF Resins, Wyandotte, Mich., under the trade designations IRGACURE 1173, IRGACURE 4265, IRGACURE 819, LUCIRIN TPO, LUCIRIN TPO-L, and DAROCUR 4265.

Figure 2:
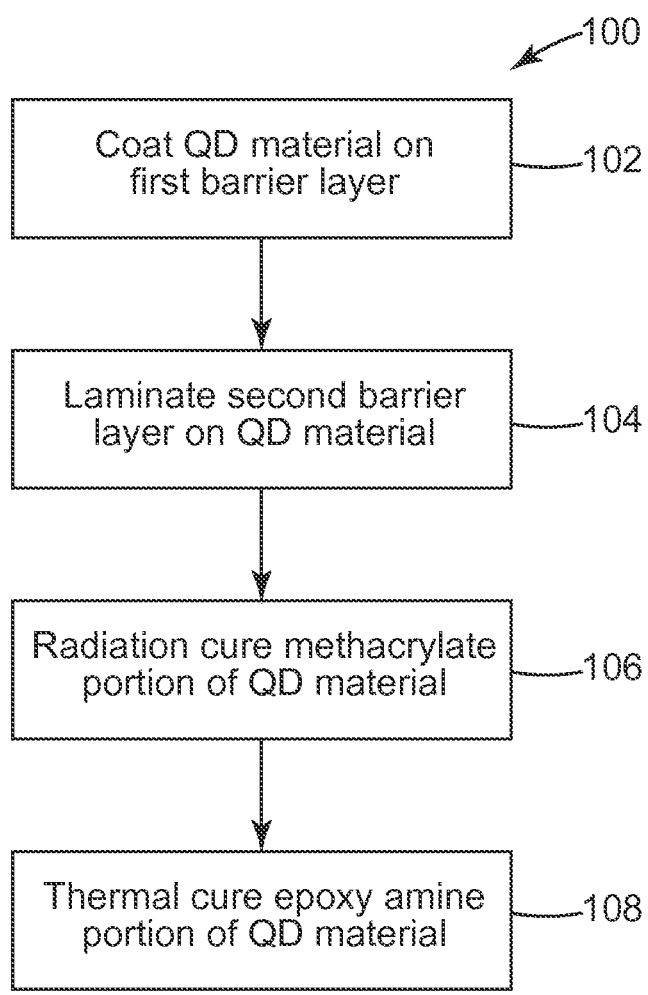
FIG. 2 is a flow diagram of an illustrative method of forming a quantum dot film.

Referring to FIG. 2, in another aspect, the present disclosure is directed to a method of forming a quantum dot film article 100 including coating an adhesive composition including quantum dots on a first barrier layer 102 and disposing a second barrier layer on the quantum dot material 104. In some embodiments, the method 100 includes polymerizing (e.g., radiation curing) the radiation curable methacrylate compound to form a partially cured quantum dot material 106 and polymerizing (e.g., thermal curing) the diepoxide and the amine-functional compound of the partially cured quantum dot material to form a cured matrix 108.

In some embodiments, the adhesive composition can be cured or hardened by heating to a temperature of about 70° C. to about 120° C. In other embodiments, the adhesive composition may also be cured or hardened by applying radiation such as, for example, ultraviolet (UV) light. Curing or hardening steps may include UV curing, heating, or both.

In some example embodiments that are not intended to be limiting, UV cure conditions can include applying about 10 mJ/cm² to about 4000 mJ/cm² of UVA, more preferably about 10 mJ/cm² to about 200 mJ/cm² of UVA. Heating and UV light may also be applied alone or in combination to increase the viscosity of the adhesive composition, which can allow easier handling on coating and processing lines.

In some embodiments, the adhesive composition may be cured after lamination between the overlying barrier films 32, 34. Thus, the increase in viscosity of the adhesive composition locks in the coating quality right after lamination. By curing right after coating or laminating, in some embodiments the cured methacrylate polymer increases the viscosity of the adhesive composition to a point that the adhesive composition acts as a pressure sensitive adhesive (PSA) to hold the laminate together during the thermal cure of the epoxy amine and greatly reduces defects during a cure of the epoxy amine. In some embodiments, the radiation cure of the methacrylate compound of the adhesive composition provides greater control over coating, curing and web handling as compared to traditional thermal curing of an epoxy only laminating adhesive composition.

Once at least partially cured, the adhesive composition forms an interpenetrating polymer network that provides a protective supporting matrix 24 for the quantum dots 22. In this application the term interpenetrating polymer network refers to a combination of two or more polymers in network form that are synthesized in juxtaposition. In various embodiments, the cured supporting matrix 24 includes about 70 wt % to about 100 wt %, about 70 wt % to about 90 wt %, or about 75 wt % to about 85 wt %, of the epoxy amine polymer. In various embodiments, the cured supporting matrix 24 includes about 0 wt % to about 25 wt %, about 5 wt % to about 25 wt %, or about 10 wt % to about 20 wt %, of the methacrylate polymer.

Edge ingress is defined by a loss in quantum dot performance due to ingress of moisture and/or oxygen into the matrix 24. In various embodiments, the edge ingress of moisture and oxygen into the cured matrix 24 is less than about 1.25 mm after 1 week at 85° C., or about less than 0.75 mm after 1 week at 85° C., or less than about 0.5 mm after 1 week at 85° C. In various embodiments, oxygen permeation into the cured matrix is less than about 80 (cc·mil)/(m² day), or less than about 50 (cc·mil)/(m² day). In various embodiments, the water vapor transmission rate of the cured matrix should be less than about 15 (20 g/m²·mil·day), or less than about 10 (20 g/m²·mil·day).

In various embodiments, the thickness of the quantum dot layer 20 is about 80 microns to about 250 microns.

Figure 3:
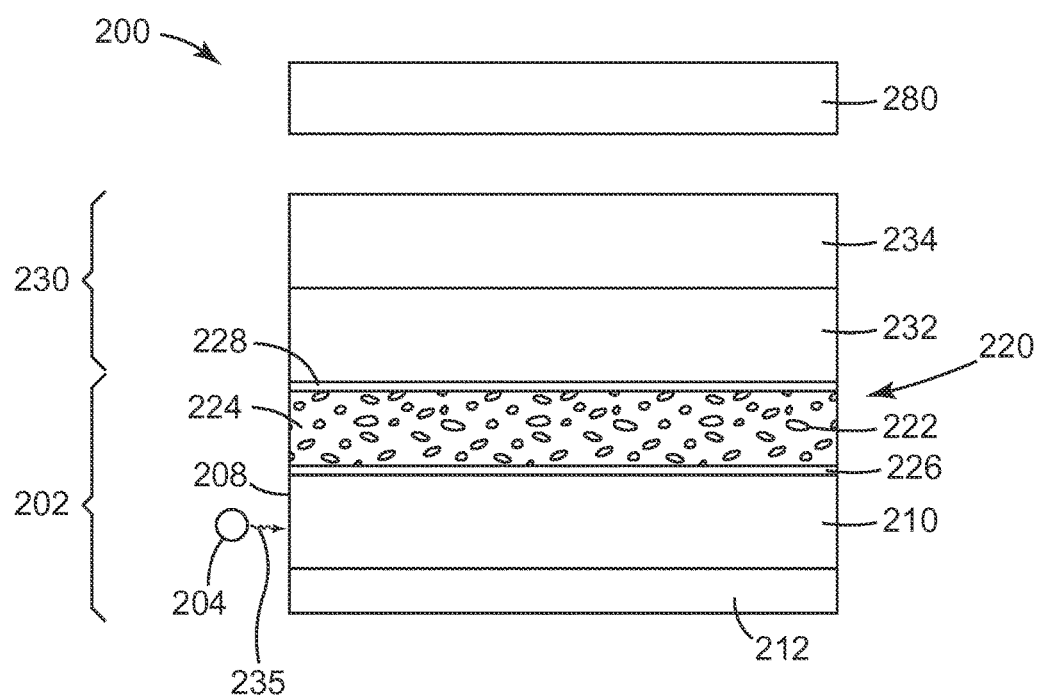
FIG. 3 is a schematic illustration of an embodiment of a display including a quantum dot article.

FIG. 3 is a schematic illustration of an embodiment of a display device 200 including the quantum dot articles described herein. This illustration is merely provided as an example and is not intended to be limiting. The display device 200 includes a backlight 202 with a light source 204 such as, for example, a light emitting diode (LED). The light source 204 emits light along an emission axis 235. The light source 204 (for example, a LED light source) emits light through an input edge 208 into a hollow light recycling cavity 210 having a back reflector 212 thereon. The back reflector 212 can be predominately specular, diffuse or a combination thereof, and is preferably highly reflective. The backlight 202 further includes a quantum dot article 220, which includes a protective matrix 224 having dispersed therein quantum dots 222. The protective matrix 224 is bounded on both surfaces by polymeric barrier films 226, 228, which may include a single layer or multiple layers.

The display device 200 further includes a front reflector 230 that includes multiple directional recycling films or layers, which are optical films with a surface structure that redirects off-axis light in a direction closer to the axis of the display, which can increase the amount of light propagating on-axis through the display device, this increasing the brightness and contrast of the image seen by a viewer. The front reflector 230 can also include other types of optical films such as polarizers. In one non-limiting example, the front reflector 230 can include one or more prismatic films 232 and/or gain diffusers. The prismatic films 232 may have prisms elongated along an axis, which may be oriented parallel or perpendicular to an emission axis 235 of the light source 204. In some embodiments, the prism axes of the prismatic films may be crossed. The front reflector 230 may further include one or more polarizing films 234, which may include multilayer optical polarizing films, diffusely reflecting polarizing films, and the like. The light emitted by the front reflector 230 enters a liquid crystal (LC) panel 280. Numerous examples of backlighting structures and films may be found in, for example, Publication No. US 2011/0051047.

Various embodiments are provided that are a film, method, or adhesive composition.

Embodiment 1 is a quantum dot film article comprising:
a first barrier layer;
a second barrier layer; and
a quantum dot layer between the first barrier layer and the second barrier layer, the quantum dot layer comprising quantum dots dispersed in a matrix comprising a cured adhesive composition, wherein the adhesive composition comprises an epoxide, an amino-functional compound of Formula I:

$$H_2N-C_nH_{2n}-A-C_mH_{2m}NH_2 \quad \text{Formula I}$$

wherein A is a monocyclic or a polycyclic alkylene group, or a monocyclic or a polycyclic heteroalkylene group, and m and n are integers each independently selected from 0 to 5; and a radiation curable methacrylate compound.

Embodiment 2 is the film article of embodiment 1, wherein the epoxide comprises a bisphenol-F backbone.

Embodiment 3 is the film article of any one of embodiments 1-2, wherein the epoxide is a diepoxide.

Embodiment 4 is the film article any one of embodiments 1-3, wherein the amino-functional compound has a group A of Formula II:

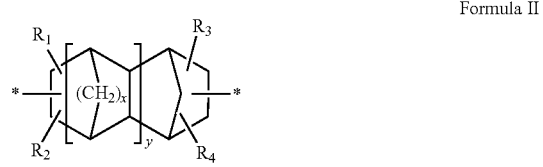

Formula II wherein $R_1$, $R_2$, $R_3$, and $R_4$, each represent either a hydrogen atom or a methyl group; and x and y are each independently selected from 0 or 1; and the asterisk (*) represents the position where the group A attaches to other groups in Formula I.

Embodiment 5 is the film article any one of embodiments 1-3, wherein the amino-functional compound has a group A of Formula III:

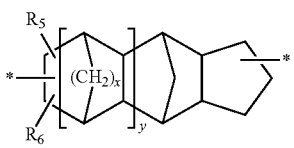

Formula III wherein $R_5$ and $R_6$ each represent either a hydrogen or a methyl group; x and y are each independently selected from 0 or 1; and the asterisk (*) represents the position where the group A attaches to other groups in Formula I.

Embodiment 6 is the film article of any one of embodiments 1-5, wherein the amino-functional compound is represented by any of the following:

(a) 3(or 4), 8(or 9)-diaminomethyltricyclo(5,2,1,0$^{2.6}$) decane:

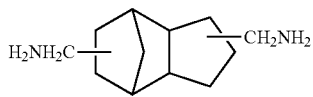

(b) 4,9(or 10)-diaminomethyltetracyclo(6,2,1,1$^{3.6}$,0$^{2.7}$) dodecane:

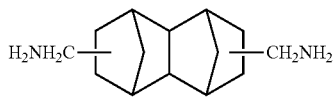

or,
(c) 2,5(or 6)-diaminomethyl bicyclo(2,2,1)heptane:

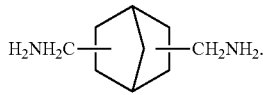

Embodiment 7 is the film article of any one of embodiments 1-6, wherein the adhesive composition further comprises a photoinitator.

Embodiment 8 is the film article of any one of embodiments 1-7, wherein the matrix comprises about 5 wt % to about 25 wt % of the methacrylate compound and 70 to 90 wt % of an epoxy polymer formed from the reaction of the epoxide and the amino-functional compound.

Embodiment 9 is the film article of any one of embodiments 1-8, wherein the matrix further comprises scattering particles having an average size in a range from 1 to 10 micrometers.

Embodiment 10 is the film article of any one of embodiments 1-9, wherein at least one of the first and the second barrier layer comprises at least one polymeric film.

Embodiment 11 is the film article of any one of embodiments 1-10, wherein the matrix has a moisture and oxygen ingress of less than about 1.25 mm after 1 week at 85° C.

Embodiment 12 is the film article of any one of embodiments 1-10, wherein the matrix has an oxygen permeation of less than about 80 (cc·mil)/(m$^2$ day).

Embodiment 13 is the film article of any one of embodiments 1-10, wherein the matrix has a water vapor transmission rate of less than about 15 (20 g/m$^2$·mil·day).

Embodiment 14 is a display device comprising the film article of any one of embodiments 1-13.

Embodiment 15 is a method of forming a film article, comprising coating a quantum dot material on a first polymeric film, the quantum dot material comprising quantum dots in an adhesive composition comprising an epoxide, an amino-functional compound of Formula I:

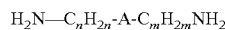

Formula I wherein A is a monocyclic or a polycyclic alkylene group, or a monocyclic or a polycyclic heteroalkylene group, and m and n are integers each independently selected from 0 to 5; a radiation curable methacrylate compound, and a photoinitiator.

Embodiment 16 is the method of embodiment 15, further comprising curing the adhesive composition.

Embodiment 17 is the method of embodiment 15, further comprising applying a second polymeric film on the adhesive composition.

Embodiment 18 is the method of embodiment 17, further comprising curing the adhesive composition.

Embodiment 19 is the method of any one of embodiments 16-18, wherein the adhesive composition is cured by applying to the composition heat and UV light.

Embodiment 20 is an adhesive composition comprising an epoxide, an amino-functional compound of Formula I:

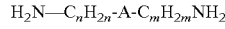

Formula I wherein A is a monocyclic or a polycyclic alkylene group, or a monocyclic or a polycyclic heteroalkylene group, and m and n are integers each independently selected from 0 to 5; a radiation curable methacrylate compound, a photoinitiator, and quantum dots.

Embodiment 21 is an adhesive composition, including an epoxide; an amino-functional compound of Formula I:

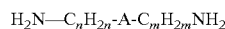

Formula I wherein A is a monocyclic or a polycyclic alkylene group, or a monocyclic or a polycyclic heteroalkylene group, and m and n are integers each independently selected from 0 to 5; and quantum dots.

Embodiment 22 is an adhesive composition of embodiment 21, further including a photoinitiator.

Some of the advantages of the quantum dot articles are further illustrated by the following examples. The particular materials, amounts and dimensions recited in these examples, as well as other conditions and details, should not be construed to unduly limit the present disclosure.

EXAMPLES

Materials Used:
EPON 824: Bisphenol A backbone epoxy resin available from Momentive Specialty Chemicals (Columbus, Ohio).
EPON 862: Bisphenol F backbone epoxy resin available from Momentive Specialty Chemicals (Columbus, Ohio).
EPIC 91B: chain extended triethylene glycol diamine curing agent (available from Epic Resins, Palmyra, Wis.)
R1964-01: Red quantum dot concentrate (available from Nanosys Corp., Palo Alto Calif.)
G1964-01: Green quantum dot concentrate (available from Nanosys Corp., Palo Alto Calif.)
SR348: Bisphenol-A dimethacrylate from Sartomer USA, LLC (Exton, Pa.)
DAROCUR 4265 Photoinitiator available from BASF Resins (Wyandotte, Mich.)

2 mil barrier film—available as FTB3-M-125 from 3M Company (St. Paul Minn.)
TCD Diamine 3(4),8(9)-Bis(aminomethyl)-tricyclo[5.2.1.0 (2.6)]decane [68889-71-4] available from Oxea Corporation (Dallas, Tex.)
Silicone Release Liner UV-10 available from CP Films, Inc. (Martinsville, Va.)

Example 1

A white formula of quantum dot (QD) concentrate was mixed by adding appropriate amounts of red and green QDs. The formulation can be seen in Table 3. The red and green dot concentrates were mixed together with a high shear impeller blade such as a Cowles blade mixer at 1400 rpm for 4 minutes.

Two types of quantum dot matrix adhesive compositions were prepared; Solution B according to the present disclosure and Solution A as a control.

The components and amounts of Solution A are shown in Table 1, which was a hybrid epoxy/methacrylate formulation using the Epic 91B curing agent.

The components of Solution B (the inventive adhesive composition), a hybrid epoxy/methacrylate formulation using the TCD Diamine curing agent, are shown in Table 2. All components except for curing agents, Epic 91B or TCD Diamine, were added and mixed together. The Epic 91B or TCD Diamine was mixed with the rest of the solution immediately before coating.

TABLE 1

Solution A - Control

| Material | Weight % |
|---|---|
| Epon 824 or Epon 862 | 53.85% |
| SR348 | 13.58% |
| Darocure 4265 | 0.48% |
| Epic 91B | 25.79% |
| Soln C (Dot Concentrate) | 6.31% |
| Sum | 100.00% |

TABLE 2

Solution B

| Material | Weight % |
|---|---|
| Epon 824 or Epon 862 | 60.50% |
| SR348 | 15.26% |
| Darocure 4265 | 0.53% |
| TCD Diamine | 17.45% |
| Soln C (Dot Concentrate) | 6.26% |
| Sum | 100.00% |

TABLE 3

Solution C - Quantum Dot Concentrate

| Material | Wt % |
|---|---|
| G1964-01 | 72.91% |
| R1964-01 | 20.79% |
| SUM | 100.0% |

Each of the solutions were mixed and coated between two 2 mil (0.05 mm) silicone-treated polyester (PET) release liners (available under the trade designation UV-10 from CPFilms, Inc., Martinsville, Va.) at a thickness of 100 micrometers with a knife coater. The coatings were first cured with ultraviolet (UV) radiation using a Clearstone UV LED lamp at 385 nm at 50% power for 30 seconds and then thermally cured in an oven at 100° C. for 10 minutes. Water vapor transmission values were then measured (as water vapor transmission rates, WVTR) using a Mocon Permatran-W Model 1/50 G (available from Mocon Corporation, Minneapolis, Minn.). Oxygen permeation rates were measured using a Mocon OX-TRAN® Model 2/21 ML (available from Mocon Corporation, Minneapolis, Minn.). Table 4 shows the results of the test for Solution A and Solution B.

As can be seen in Table 4, using TCD diamine as the curing agent significantly reduces the water vapor transmission rate and reduces the oxygen permeation rate when used with Epon 862. It can also be seen in Table 4 that using a bisphenol F epoxy (Epon 862) instead of a bisphenol A epoxy (Epon 824) significantly improves the oxygen barrier properties of the film. These results point to using TCD diamine in combination with Epon 862 as resulting in improved barrier properties for this matrix film.

TABLE 4

Barrier Properties

| | Curing Agent Used | | | |
|---|---|---|---|---|
| | Epic 91B | Epic 91B | TCD Diamine | TCD Diamine |
| | Epoxy Used | | | |
| | Epon 824 | Epon 862 | Epon 824 | Epon 862 |
| WVTR (20 g/m$^2$-mil-day) | 17.8 | 19.1 | 7.2 | 5.6 |
| Oxygen Permeation (cc · mil/m$^2$-day) | 105.9 | 38.3 | 46.2 | 32.0 |

The above solutions were also coated between two 2 mil (0.05 mm) barrier films (available as FTB3-M-125 from 3M Company, St. Paul Minn.) at a thickness of 100 micrometers using a knife coater. The coatings were UV and thermally cured as described above. Adhesion testing was performed with a T-peel test (ASTM D1876-08) on samples from these coated films. Additionally the coatings were aged both at 85° C. for 1 week and 65° C./95% RH for 2 weeks and then the edge ingress was measured. Edge ingress was tested by placing the coatings on a black light and then measuring how much of the edge of the film is dark (does not illuminate) with a ruler. Results are also shown in Table 5.

As can be seen in Table 5, using TCD Diamine not only significantly reduced edge ingress after aging of the QDEF but also improved adhesion of the barrier film to the quantum dot matrix. The combination of Epon 862 with TCD Diamine provided the highest reduction in edge ingress.

TABLE 5

T-peel and Edge Ingress

| | Curing Agent Used | | | |
|---|---|---|---|---|
| | Epic 91B | Epic 91B | TCD Diamine | TCD Diamine |
| | | Epoxy Used | | |
| | Epon 824 | Epon 862 | Epon 824 | Epon 862 |
| T-peel (g/in) | 17.03 | 16.38 | 78.55 | 83.49 |
| Edge Ingress after 1 week 85° C. (mm) | 1.25 | 1.00 | 0.75 | <0.25 |
| Edge Ingress after 2 weeks 65° C./95% RH (mm) | 1.25 | 2.00 | 0.75 | <0.25 |

Various embodiments of the invention have been described. These and other embodiments are within the scope of the following claims.

The invention claimed is:

1. A quantum dot film article comprising:
   a first barrier layer;
   a second barrier layer; and
   a quantum dot layer between the first barrier layer and the second barrier layer, the quantum dot layer comprising quantum dots dispersed in a matrix comprising a cured adhesive composition, wherein the adhesive composition comprises:
   an epoxide;
   an amino-functional compound of Formula I:

$$H_2N-C_nH_{2n}-A-C_mH_{2m}-NH_2 \quad \text{Formula 1}$$

wherein A is a monocyclic or a polycyclic alkylene group, or a monocylic or a polycyclic heteroalkylene group, and m and n are integers each independently selected from 0 to 5; and
   a radiation curable methacrylate compound.

2. The film article of claim 1, wherein the epoxide comprises a bisphenol-F backbone.

3. The film article of claim 1, wherein the epoxide is a diepoxide.

4. The film article of claim 1, wherein A in Formula I is the group of Formula II:

Formula II

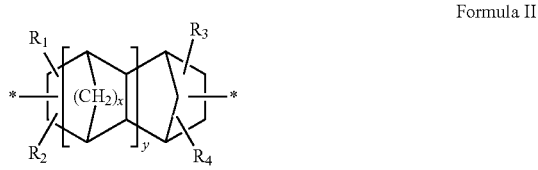

wherein $R_1$, $R_2$, $R_3$, and $R_4$, each represent either a hydrogen atom or a methyl group; x and y are each independently selected from 0 or 1; and the asterisks (*) represent attachment positions to Formula I.

5. The film article of claim 1, wherein A in Formula I is the group of Formula III:

Formula III

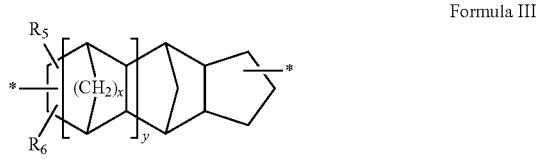

wherein $R_5$ and $R_6$ each represent either a hydrogen or a methyl group; x and y are each independently selected from 0 or 1, and the asterisks (*) represent the attachment positions to Formula I.

6. The film article of claim 1, wherein the amino-functional compound is represented by any of the following:
   (a) 3(or 4), 8(or 9)-diaminomethyltricyclo(5,2,1,0$^{2.6}$) decane:

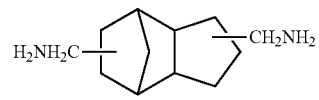

(b) 4,9(or 10)-diaminomethyltetracyclo(6,2,1,1$^{3.6}$,0$^{2.7}$) dodecane:

or,
   (c) 2,5(or 6)-diaminomethyl bicyclo(2,2,1)heptane:

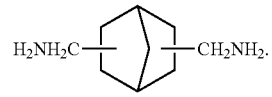

7. The film article of claim 1, wherein the adhesive composition further comprises a photoinitiator.

8. The film article of claim 1, wherein the matrix comprises about 5 wt % to about 25 wt % of the methacrylate compound and 70 to 90 wt % of an epoxy polymer formed from the reaction of the epoxide and the amino-functional compound.

9. The film article of claim 1, wherein the matrix further comprises scattering particles having an average size in a range from 1 to 10 micrometers.

10. The film article of claim 1, wherein at least one of the first and the second barrier layer comprises at least one polymeric film.

11. The film article of claim 1, wherein the matrix has a moisture and oxygen ingress of less than about 1.25 mm after 1 week at 85° C.

12. The film article of claim 1, wherein the matrix has an oxygen permeation of less than about 80 (cc·mil)/(m² day).

13. The film article of claim 1, wherein the matrix has a water vapor transmission rate of less than about 15 (20 g/m²·mil·day).

14. A display device comprising the film article of claim 1.

15. A method of forming a film article, comprising coating a quantum dot material on a first polymeric film, the quantum dot material comprising quantum dots in an adhesive composition comprising:
   an epoxide;
   an amino-functional compound of Formula I:

$$H_2N-C_nH_{2n}-A-C_mH_{2m}-NH_2 \quad \text{Formula I}$$

wherein A is a monocyclic or a polycyclic alkylene group, or a monocylic or a polycyclic heteroalkylene group, and m and n are integers each independently selected from 0 to 5;

a radiation curable methacrylate compound; and
a photoinitiator.

16. The method of claim 15, further comprising curing the adhesive composition.

17. The method of claim 15, further comprising applying a second polymeric film on the adhesive composition.

18. The method of claim 17, further comprising curing the adhesive composition.

19. The method of claim 16, wherein the adhesive composition is cured by applying to the composition heat and UV light.

20. An adhesive composition, comprising:
an epoxide;
an amino-functional compound of Formula I:

$$H_2N-C_nH_{2n}\text{-}A\text{-}C_mH_{2m}-NH_2 \qquad \text{Formula I}$$

wherein A is a monocyclic or a polycyclic alkylene group, or a monocylic or a polycyclic heteroalkylene group, and m and n are integers each independently selected from 0 to 5;

a radiation curable methacrylate compound;
a photoinitiator; and
quantum dots.

21. An adhesive composition, comprising:
an epoxide;
an amino-functional compound of Formula I:

$$H_2N-C_nH_{2n}\text{-}A\text{-}C_mH_{2m}-NH_2 \qquad \text{Formula I}$$

wherein A is a monocyclic or a polycyclic alkylene group, or a monocylic or a polycyclic heteroalkylene group, and m and n are integers each independently selected from 0 to 5; and quantum dots.

22. The adhesive composition of claim 21, further comprising a photoinitiator.

* * * * *